United States Patent
Lish et al.

(12) 
(10) Patent No.: US 8,843,108 B1
(45) Date of Patent: Sep. 23, 2014

(54) LOCATION-BASED INFORMATION SECURITY

(75) Inventors: David F. Lish, Burlingame, CA (US); Christopher H. J. Whittam, Hillsborough, CA (US); Indraneel Bhattacharyya, Las Vegas, NV (US)

(73) Assignee: Intuit Inc., Mountain View, CA (US)

(*) Notice: Subject to any disclaimer, the term of this patent is extended or adjusted under 35 U.S.C. 154(b) by 103 days.

(21) Appl. No.: 13/212,049

(22) Filed: Aug. 17, 2011

(51) Int. Cl.
  *H04M 3/16* (2006.01)
  *H04M 1/66* (2006.01)
  *H04M 11/04* (2006.01)
  *G06F 13/00* (2006.01)
  *G06F 12/16* (2006.01)
  *G06Q 40/00* (2012.01)
  *G06F 17/10* (2006.01)

(52) U.S. Cl.
  USPC .............. 455/410; 726/25; 711/114; 705/40; 455/404.2; 701/300

(58) Field of Classification Search
  USPC ........................................................ 455/410
  See application file for complete search history.

(56) References Cited

U.S. PATENT DOCUMENTS

| 7,991,382 | B1* | 8/2011 | Gunasekara | 455/404.2 |
| 8,305,264 | B1* | 11/2012 | Jones et al. | 342/357.22 |
| 2002/0108062 | A1* | 8/2002 | Nakajima et al. | 713/201 |
| 2004/0219904 | A1* | 11/2004 | De Petris | 455/410 |
| 2005/0137975 | A1* | 6/2005 | Williams | 705/40 |
| 2006/0089906 | A1* | 4/2006 | Rowley | 705/40 |
| 2008/0033644 | A1* | 2/2008 | Bannon | 701/210 |
| 2008/0086759 | A1* | 4/2008 | Colson | 726/2 |
| 2009/0181640 | A1* | 7/2009 | Jones | 455/404.2 |
| 2009/0187962 | A1* | 7/2009 | Brenneman et al. | 726/1 |
| 2010/0048167 | A1* | 2/2010 | Chow et al. | 455/410 |
| 2010/0138926 | A1* | 6/2010 | Kashchenko et al. | 726/25 |
| 2011/0022312 | A1* | 1/2011 | McDonough et al. | 701/209 |
| 2011/0022540 | A1* | 1/2011 | Stern et al. | 705/36 R |
| 2011/0034147 | A1* | 2/2011 | Issa et al. | 455/410 |
| 2011/0055474 | A1* | 3/2011 | Resch | 711/114 |
| 2011/0196714 | A1* | 8/2011 | Erhart et al. | 705/7.29 |

* cited by examiner

*Primary Examiner* — Timothy Pham
(74) *Attorney, Agent, or Firm* — Park, Vaughan, Fleming & Dowler LLP; Steven E. Stupp

(57) ABSTRACT

To facilitate security, locations of a portable electronic device may be tracked during a time interval. These tracked locations are then used to determine a location pattern, and the location pattern is used to estimate one or more secure locations. Then, when a user accesses financial information using the portable electronic device, the security level is determined based on a current location and the one or more secure locations.

20 Claims, 7 Drawing Sheets

LOCATION-BASED INFORMATION SECURITY

BACKGROUND

The present disclosure relates to techniques for determining a security level based on a current location and location history information for a portable electronic device.

Using portable electronic devices, such as cellular telephones, to conduct financial transactions is becoming increasingly popular. For example, smartphones can execute applications that allow users to pay bills or check their account balances.

However, the same features that make these portable electronic devices popular (notably, their mobility) also create security risks. As a consequence, many financial applications used on portable electronic devices ask users additional security questions prior to allowing the users to conduct financial transactions.

While this approach can improve security on portable electronic devices, it is often cumbersome and inconvenient for users to answer the additional security questions every time they want to conduct a financial transaction. Moreover, repeatedly answering the additional security questions can degrade the user experience, with a commensurately adverse impact on customer loyalty and commercial activity.

SUMMARY

The disclosed embodiments relate to a computer system that determines a security level based on location information. During operation, the computer system tracks locations of a portable electronic device during a time interval. Moreover, the computer system determines a location pattern based on the tracked locations and estimates one or more secure locations based on the determined location pattern. Then, when a user accesses financial information using the portable electronic device, the computer system determines the security level based on a current location and the one or more secure locations. (More generally, the user may access information that is privileged or private information of the user, which is sometimes referred to as 'sensitive information.')

Note that the one or more secure locations may include: routine locations that the user of the portable electronic device visited at least N times during the time interval; regions proximate to the routine locations that the user of the portable electronic device visited at least N times during the time interval; and/or ZIP codes.

Furthermore, if the current location is within or proximate to one of the secure locations, the determined security level makes it easier for the user to access the financial information than the security level when the current location is outside of the secure locations.

In some embodiments, the computer system tracks timestamps during the time interval when the portable electronic device is at the locations, where the determined location pattern is further based on the timestamps. Then, after receiving a timestamp when the portable electronic device is at the current location, the computer system may also determine the security level based on the timestamp.

The locations may be tracked using: a global positioning system, a cellular telephone system, and/or a local positioning system. In some embodiments, the locations are tracked according to a hierarchy, in which: if available, the global positioning system is used to track the locations; if the global positioning system is unavailable, the cellular telephone system is used to track the locations; and if the cellular telephone system is unavailable, previously tracked locations during at least a portion of the time interval are used to estimate the locations. Alternatively, instead of using the previously tracked locations, the locations may be estimated based on a last known location of the portable electronic device and measurements performed using an accelerometer in the portable electronic device.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for determining a security level, and a computer-program product (e.g., software) for use with the computer system are described. During the security technique, locations of a portable electronic device may be tracked during a time interval. These tracked locations are then used to determine a location pattern, and the location pattern is used to estimate one or more secure locations. Then, when a user accesses financial information using the portable electronic device, the security level is determined based on a current location and the one or more secure locations.

By setting the security level based on the user's prior location pattern and the current location, this security technique may facilitate selection of an appropriate level of security in accordance with the risk when the user accesses the financial information using the portable electronic device. Moreover, by not always requiring the user to answer additional security questions, the security technique may make it easier and more convenient for the user to access the financial information when the user is in or proximate to the one or more secure locations, thereby increasing user satisfaction and customer loyalty.

In the discussion that follows, the user may include one of a variety of entities, such as: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
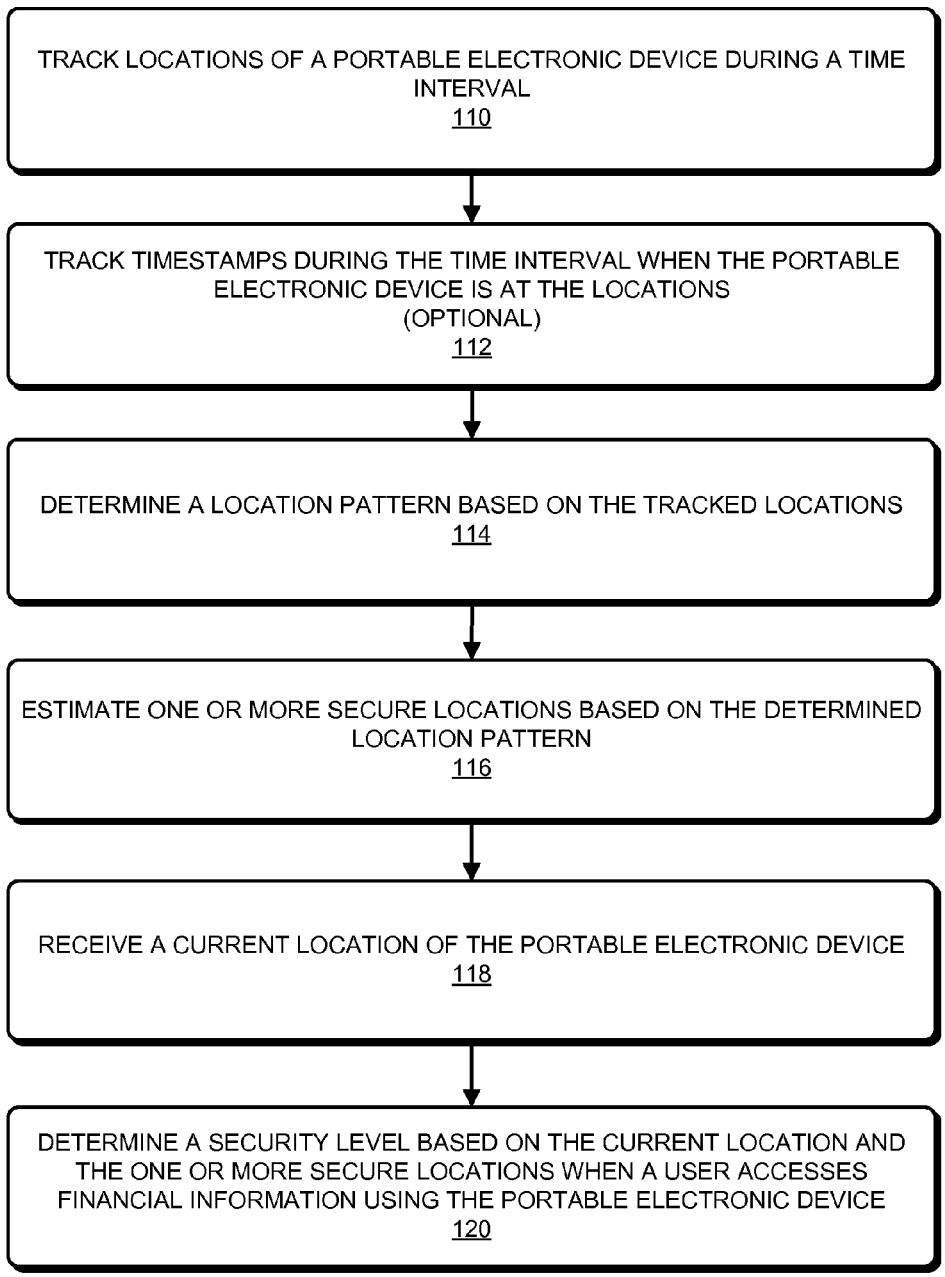
FIG. 1 is a flow chart illustrating a method for providing product information to a user in accordance with an embodiment of the present disclosure.

We now describe embodiments of the security technique. FIG. 1 presents a flow chart illustrating a method 100 for determining a security level, which may be performed by a system (such as system 500 in FIG. 5) and/or a computer system (such as computer system 600 in FIG. 6). During operation, the computer system tracks locations of a portable electronic device during a time interval (operation 110). For example, the locations may be tracked using: a global positioning system, a cellular telephone system, and/or a local positioning system.

Figure 2:
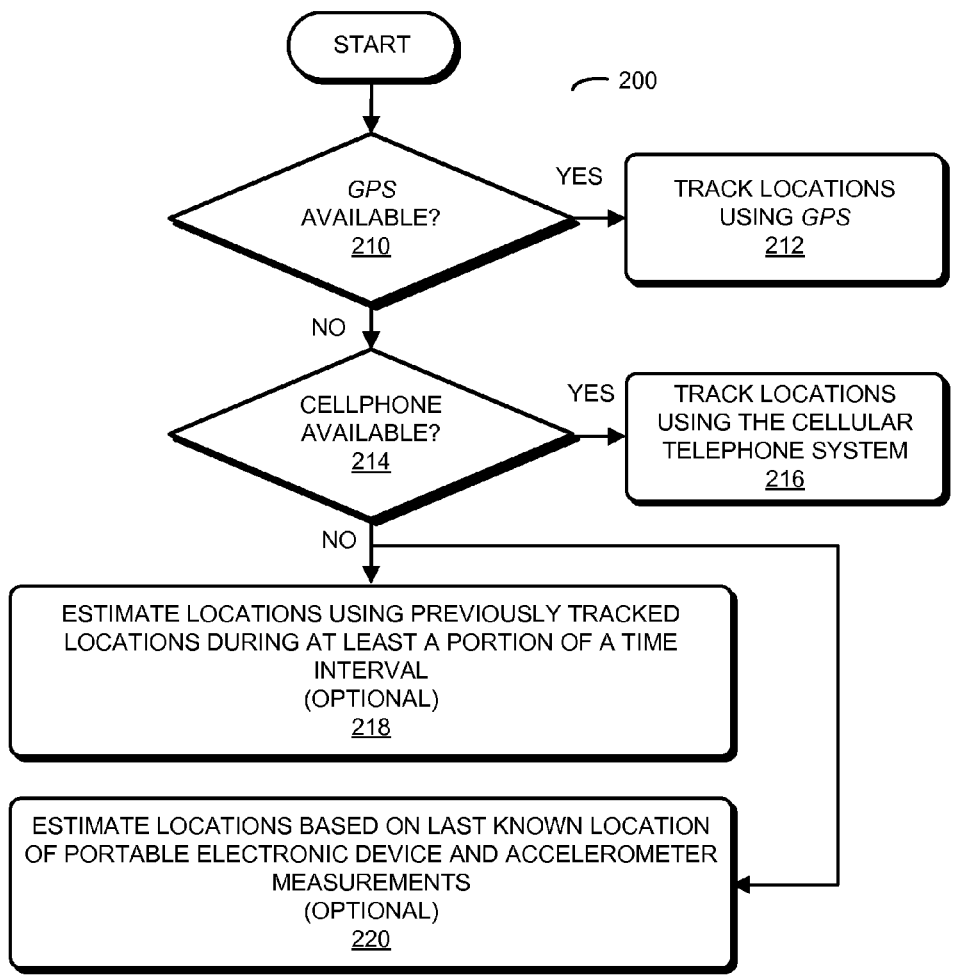
FIG. 2 is a flow chart illustrating a method for tracking locations in accordance with an embodiment of the present disclosure.

As shown in FIG. 2, which presents a flow chart illustrating a method 200 for tracking locations, the locations may be tracked according to a hierarchy, in which: if available (operation 210), the global positioning system (GPS) is used to track the locations (operation 212); if the global positioning system is unavailable (operation 210) and the cellular telephone system is available (operation 214), the cellular telephone system is used to track the locations (operation 216); and if the cellular telephone system is unavailable (operation 214), use previously tracked locations during at least a portion of the time interval to optionally estimate the locations (operation 218). Alternatively, instead of using the previously tracked locations, the locations may be optionally estimated based on a last known location of the portable electronic device and measurements performed using an accelerometer in the portable electronic device (operation 220).

Referring back to FIG. 1, the computer system determines a location pattern based on the tracked locations (operation 114) and estimates one or more secure locations based on the determined location pattern (operation 116). Note that the one or more secure locations may include: routine locations that the user of the portable electronic device visited at least N times during the time interval; regions proximate to the routine locations that the user of the portable electronic device visited at least N times during the time interval; and/or ZIP codes.

Then, after receiving a current location of the portable electronic device (operation 118), the computer system determines the security level based on the current location and the one or more secure locations (operation 120) when a user accesses financial information using the portable electronic device. In particular, if the current location is within or proximate to one of the secure locations, the determined security level makes it easier for the user to access the financial information than the security level when the current location is outside of the secure locations. For example, the computer system may ask fewer security questions when the current location is within or proximate to one of the secure locations.

(While financial information is used as an illustrative example, more generally the user may access information that is privileged or private information of the user, which is sometimes referred to as 'sensitive information.' For example, the user may access: credential information, contact information, personal information, etc.)

In some embodiments, the security level is, at least in part, determined using temporal windowing. In particular, the computer system may optionally track timestamps during the time interval when the portable electronic device is at the locations (operation 112). These timestamps may also be used to determine the location pattern. Then, after receiving a timestamp when the portable electronic device is at the current location, the computer system may also determine the security level based on the timestamp. For example, the user may be at home in the early morning and the late afternoon and evening. This temporal information may be used to determine if the user is at one of the secure locations (in this case, their home) at an appropriate time (early morning, late afternoon, or evening) and may accordingly determine the security level.

In this way, method 100 may facilitate an appropriate trade-off between security and convenience based on the user's current location and/or the timestamp. In particular, while the portable electronic device is mobile, by identifying the one or more secure locations, the user's routine patterns of behavior can be used to assess whether the user's current location poses a higher security risk, and the security precautions (which may be based on the security level) can be accordingly modified.

Note that even when the user is using the portable electronic device in one of the secure locations, a base level of security may still be used when the user accesses financial information or conducts a financial transaction using the portable electronic device. For example, the user may have to provide credential information (such as a username and a password) prior to accessing the financial information when using the portable electronic device in one of the secure locations. Alternatively or additionally, the financial information may be encrypted when communicated between the computer system and the portable electronic device.

Figure 3:
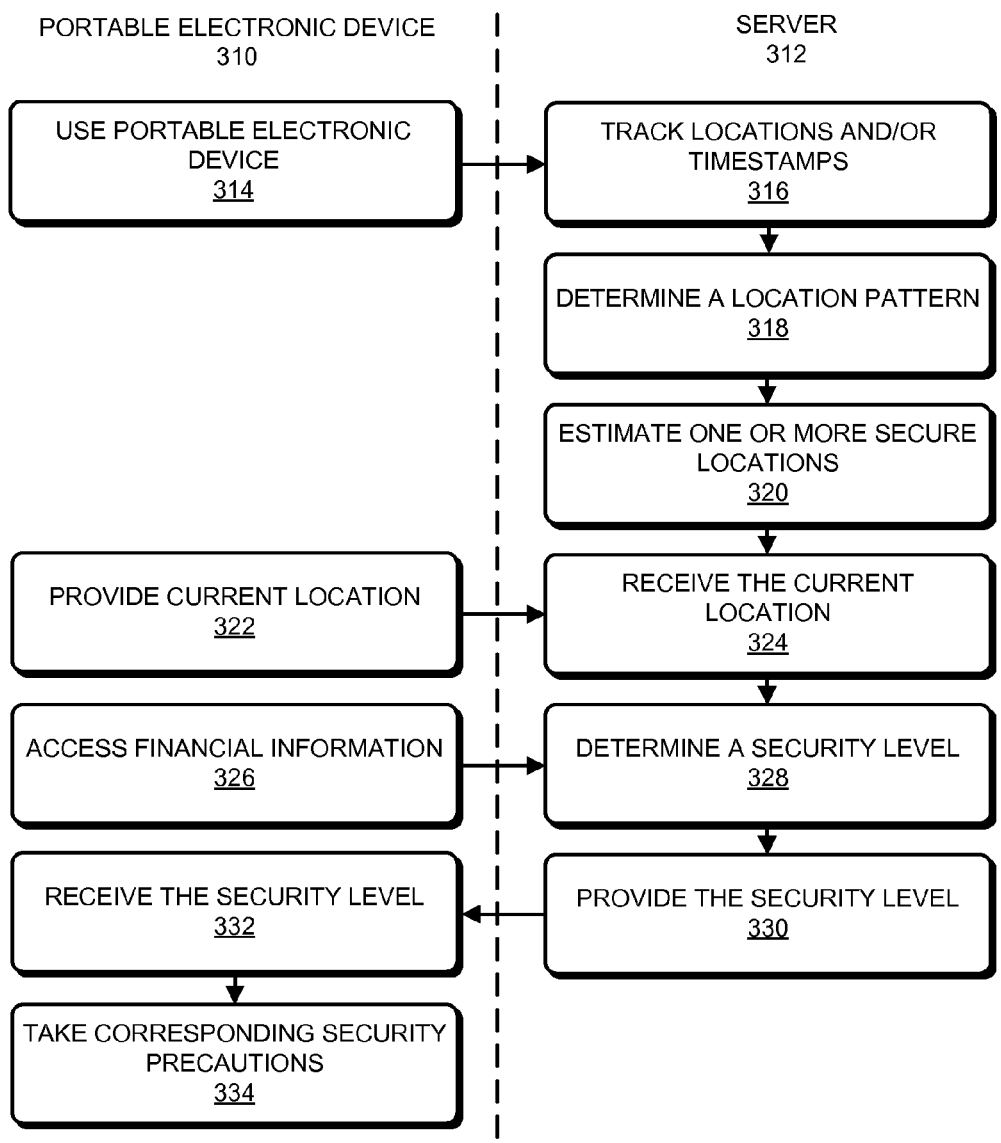
FIG. 3 is a flow chart illustrating the method of FIG. 1 in accordance with an embodiment of the present disclosure.

In an exemplary embodiment, the security technique is implemented using a portable electronic device (such as a cellular telephone) and a server, which communicate through a network, such as a cellular-telephone network and/or the Internet (e.g., using a client-server architecture). This is illustrated in FIG. 3, which presents a flow chart illustrating method 100. During this method, a user may use a portable electronic device 310 (operation 314). Server 312 may track locations and/or timestamps (operation 316) of portable electronic device 310 during a time interval.

Moreover, server 312 may determine a location pattern (operation 318) based on the tracked locations and may estimate one or more secure locations (operation 320) based on the determined location pattern.

Subsequently, portable electronic device 310 may provide a current location (operation 322), which is received (operation 324) by server 312.

Furthermore, when a user accesses financial information (operation 326) using portable electronic device 310, server 312 may determine a security level (operation 328) based on the current location and the one or more secure locations. This security level may be provided to (operation 330) and received by (operation 332) portable electronic device 310, which uses the security level to take corresponding security precautions (operation 334) when the user accesses the financial information.

In some embodiments of method 100 (FIGS. 1 and 3) and 200 (FIG. 2), there may be additional or fewer operations. Moreover, the order of the operations may be changed, and/or two or more operations may be combined into a single operation.

In an exemplary embodiment, the security technique is used to provide a user-specific, location-based layer of security that, by analyzing the normal migrational patterns of the user and using a current physical location, determines where it is safe for a portable electronic device to conduct a financial transaction (such as accessing the financial information) and where an additional layer of security should be employed. In this way, the security technique can be used to balance security and convenience when users access the financial information while 'on the go.'

Figure 4:
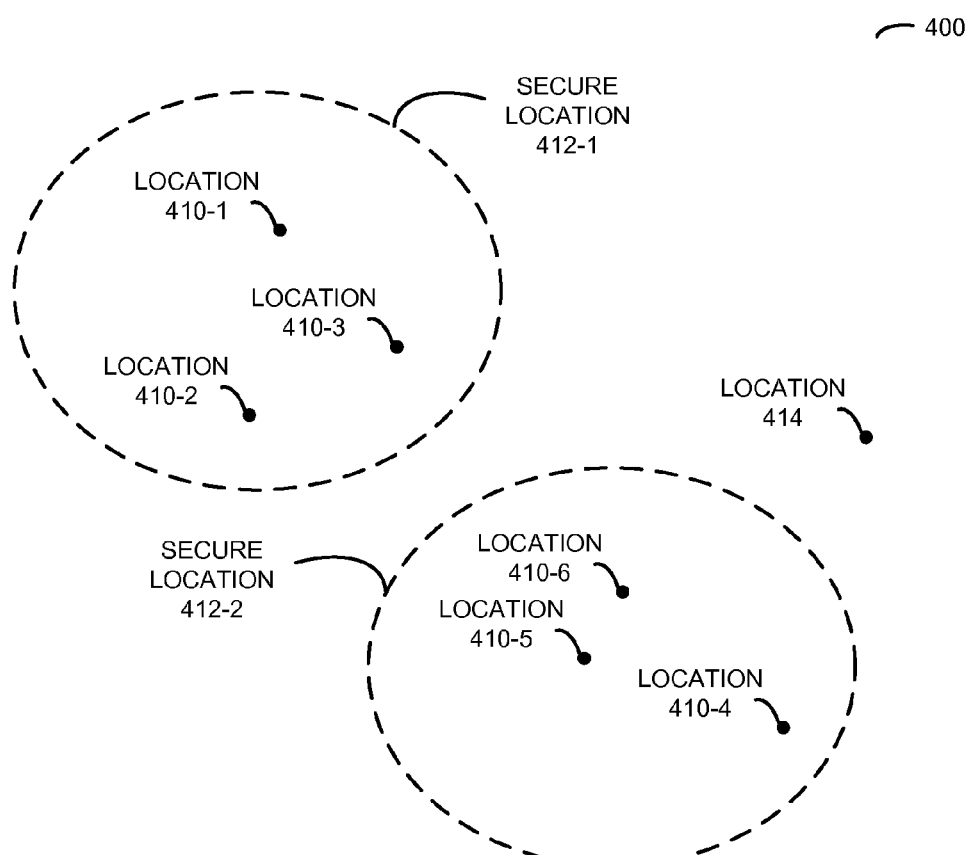
FIG. 4 is a drawing illustrating the determination of a security level in accordance with an embodiment of the present disclosure.

For example, as shown in FIG. 4, which presents a drawing 400 illustrating the determination of a security level, the security technique may leverage the global-positioning-system functionality on portable electronic devices to create a computer-readable data structure of the locations 410 that a user typically visits. Longitude and latitude from this data structure may be cross-referenced with a computer-readable data structure of ZIP codes to determine the ZIP code(s) in which the user spends the most time.

Using these locations, a determination can be made as to whether the user is in a 'safe' zone or secure location (such as one of the areas where the user has an established visitation pattern and which is therefore deemed safe to conduct a financial transaction or to access the financial information) when the user attempts to access sensitive data (such as the financial information). If the portable electronic device is attempting to access the sensitive data at a location 414 outside of one of the user's defined secure locations 412, the user may be required to answer additional security questions prior to accessing the data.

For example, Neel may use a banking application on his cellular telephone to conduct mobile-banking financial transactions. This banking application may implement the security technique as a security feature that provides a layer of security that helps to ensure that his financial information stays safe. When he logs into the banking application, he may be asked for the ZIP code where he uses his cellular telephone most often. After entering the ZIP code, the security technique may use this information to establish a safe zone or a secure location where Neel is able to conduct financial transactions on his cellular telephone without an additional layer of security. This security feature may initially establish a safe zone with a one ZIP code radius outside of Neel's identified home zone (i.e., the ZIP code provided by Neel).

Over the course of the next several months, Neel may commute back and forth to his job 45 miles away (3 ZIP codes north). Neel may be unaware that, the whole time he has been driving back and forth, the security feature has tracked his normal or usual migration patterns. In particular, the security feature may use coordinates associated with a global positioning system from each of the locations where Neel spent more than 1.5 hours and cross-referenced these locations with a data structure that includes all known ZIP codes. Because Neel visited the same ZIP code more than 3 times in the last 6 months, this ZIP code was also established as another safe zone or secure location.

This process may continue over the course of the next year, so that other locations where Neel has now spent enough time, such as his cabin, work, home, and parents' house, are also established as safe zones or secure locations. Whenever he uses the banking application on his portable electronic device in one of these ZIP codes, additional layers of security are not necessary (thus, he may not have to answer additional security questions).

If Neel's cellular telephone is ever stolen and the thief takes the phone to a foreign country, when the thief turns on Neel's cellular telephone and tries to use the banking application to wire Neel's money to an offshore bank account, the security feature detects that the cellular telephone is no longer in an established safe zone and activates additional security features that lock down the cellular telephone unless the thief is able to answer additional security questions.

Similarly, if Neel goes on vacation, the security feature will recognize that he is outside of his established safe zone(s) and will ask him one or more additional security question(s) before allowing him to access the financial information (or, more generally, to conduct a financial transaction).

Figure 5:
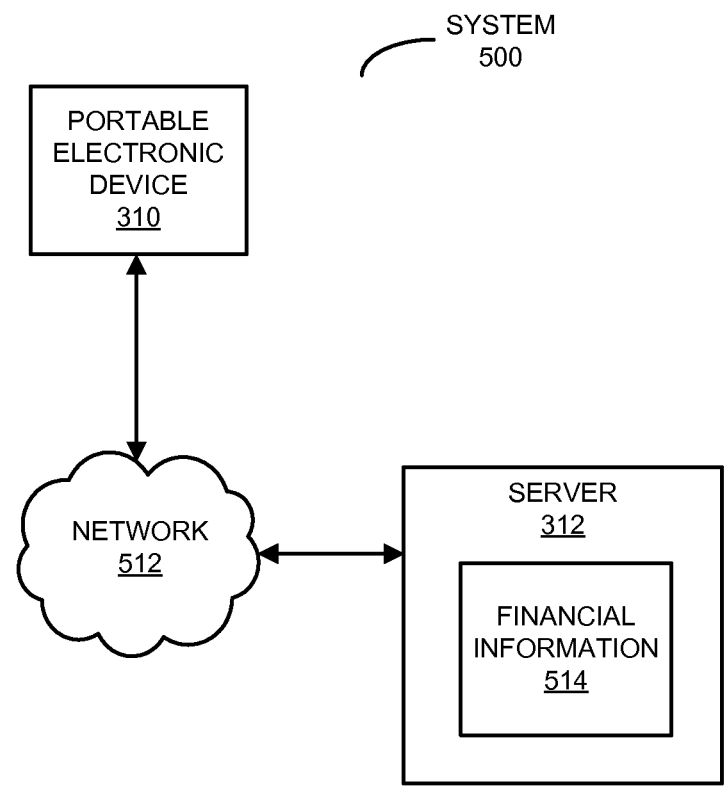
FIG. 5 is a block diagram illustrating a system that performs the methods of FIGS. 1, 2 and 3 in accordance with an embodiment of the present disclosure.

We now describe embodiments of the system and the electronic device, and their use. FIG. 5 presents a block diagram illustrating a system 500 that performs methods 100 (FIGS. 1 and 3) and 200 (FIG. 2). In this system, a user of portable electronic device 310 may use a financial software application. This financial software application may be resident on and may execute on portable electronic device 310. Alternatively, the user may interact with a web page that is provided by server 312 via network 512, and which is rendered by a web browser on portable electronic device 310. For example, at least a portion of the financial software application may be a financial application tool that is embedded in the web page, and which executes in a virtual environment of the web browser. Thus, the financial software application tool may be provided to the user via a client-server architecture. Furthermore, the financial software application may be a standalone application or a portion of another application that is resident on and which executes on portable electronic device 310.

As discussed previously, server 312 may interact with portable electronic device 310 via network 512 to track locations of portable electronic device 310. These locations may be analyzed by server 312 to determine a location pattern and to estimate the one or more secure locations.

Then, when the user attempts to use the financial software application to access financial information 514 via network 512, the current location of portable electronic device 310 may be used by server 312 along with the one or more secure locations to determine the security level. This security level may be communicated to portable electronic device 310 by server 312 via network 512, and the security level may be used to ensure that appropriate security precautions are taken when the user accesses financial information 514.

Note that information in system 500 may be stored at one or more locations in system 500 (i.e., locally or remotely). Moreover, because this data may be sensitive in nature, at least some of it may be encrypted. For example, at least some of the stored data and/or the data communicated via network 512 may be encrypted.

Figure 6:
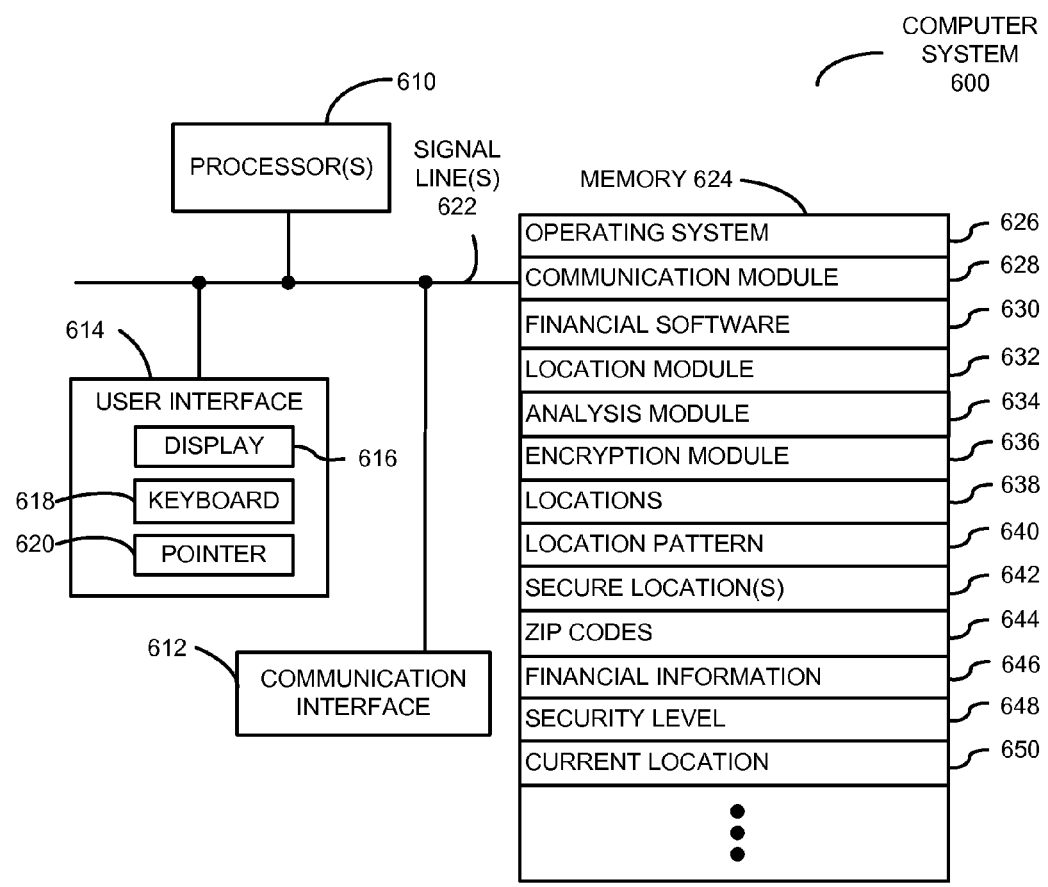
FIG. 6 is a block diagram illustrating a computer system that performs the methods of FIGS. 1, 2 and 3 in accordance with an embodiment of the present disclosure.

FIG. 6 presents a block diagram illustrating a computer system 600 that performs method 100 (FIGS. 1 and 2), such as server 312 (FIGS. 2 and 4). Computer system 600 includes one or more processing units or processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: financial software 630 (or a set of instructions), location module 632 (or a set of instructions), analysis module 634 (or a set of instructions), and/or encryption module 636 (or a set of instructions). Note that one or more of these program modules (or sets of instructions) may constitute a computer-program mechanism.

During method 100 (FIGS. 1 and 3), location module 632 may track locations 638 of a portable electronic device used by a user. Then, analysis module 634 may analyze locations 638 to determine location pattern 640 and to estimate one or more secure location(s) 642. In some embodiments, the one or more secure location(s) 642 are determined based on ZIP codes 644.

Figure 7:
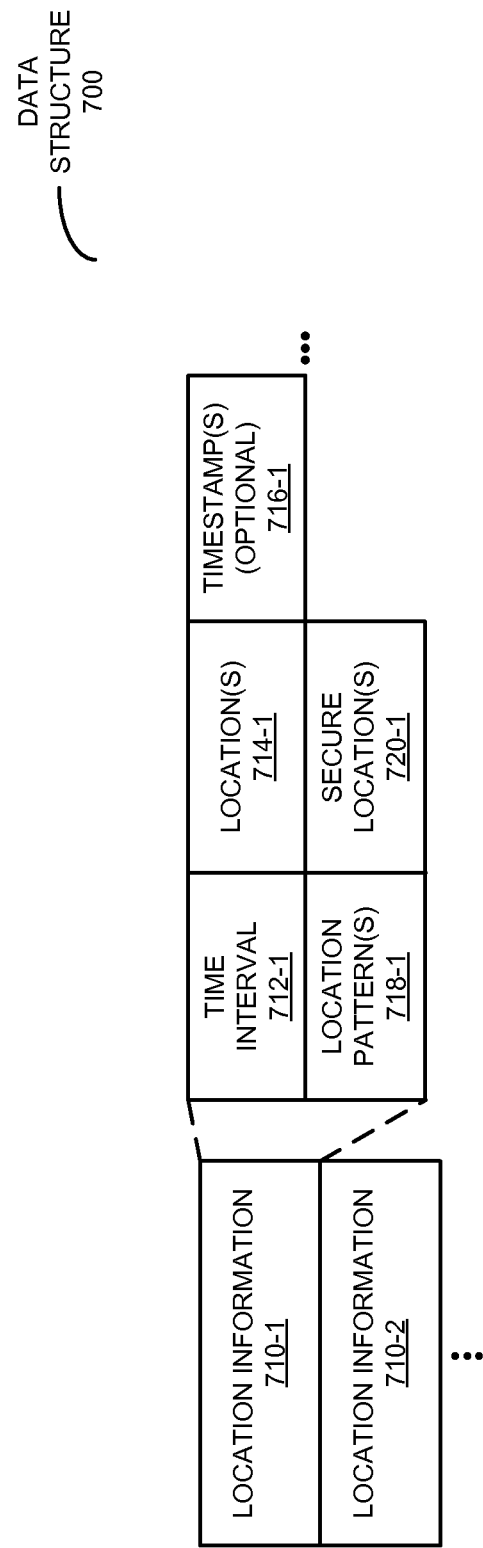
FIG. 7 is a block diagram illustrating a data structure for use in the computer system of FIG. 6 in accordance with an embodiment of the present disclosure.

Note that the location information may be stored in a common computer-readable data structure. This is shown in FIG. 7, which illustrates a data structure 700 that includes location information. For example, location information 710-1 may include: a time interval 712-1, one or more tracked location(s) 714-1, one or more optional timestamps 716-1, one or more location pattern(s) 718-1, and/or one or more secure location(s) 720-1.

Referring back to FIG. 6, when the user subsequently attempts to access financial information 646 using financial software 630, a security level 648 is determined based on the one or more secure location(s) 642 and a current location 650 of the portable electronic device.

Because information in computer system 600 may be sensitive in nature, in some embodiments at least some of the data stored in memory 624 and/or at least some of the data communicated using communication module 628 is encrypted using encryption module 636.

Instructions in the various modules in memory 624 may be implemented in: a high-level procedural language, an object-oriented programming language, and/or in an assembly or machine language. Note that the programming language may be compiled or interpreted, e.g., configurable or configured, to be executed by the one or more processors 610.

Although computer system 600 is illustrated as having a number of discrete items, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 may be implemented in one or more application-specific integrated circuits (ASICs) and/or one or more digital signal processors (DSPs).

Electronic devices (such as computer system 600), as well as computers and servers in system 500 (FIG. 5) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 512 (FIG. 5) may include: the Internet, World Wide Web (WWW), an intranet, a cellular-telephone network, LAN, WAN, MAN, or a combination of networks, or other technology enabling communication between computing systems.

In some embodiments financial software 630 may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, financial software 630 may be associated with and/or include software such as: QuickBooks™, Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

System 500 (FIG. 5), computer system 600 and/or data structure 700 (FIG. 7) may include fewer components or additional components. Moreover, two or more components may be combined into a single component, and/or a position of one or more components may be changed. In some embodiments, the functionality of system 500 (FIG. 5) and/or computer system 600 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method comprising:
tracking locations of a portable electronic device during a time interval;
determining a location pattern based on the tracked locations;
estimating one or more secure locations based on the determined location pattern;
receiving a current location of the portable electronic device; and
when a user accesses financial information using the portable electronic device, determining a security level by:

when the current location comprises a location in the one or more secure locations, presenting a security challenge to the user and causing access to be granted to the financial information when the user correctly answers the security challenge, and otherwise, when the current location is different from the one or more secure locations, presenting the security challenge and one or more additional security challenges to the user and causing access to be granted to the financial information when the user correctly answers the security challenge and the one or more additional security challenges.

2. The method of claim 1, wherein the one or more secure locations include routine locations that the user of the portable electronic device visited at least N times during the time interval.

3. The method of claim 1, wherein, if the current location is within or proximate to one of the secure locations, the determined security level makes it easier for the user to access the financial information than the security level when the current location is outside of the secure locations.

4. The method of claim 1, wherein the method further comprises:

tracking timestamps during the time interval when the portable electronic device is at the locations, wherein the determined location pattern is further based on the timestamps; and receiving a timestamp when the portable electronic device is at the current location, wherein the determined security level is further based on the timestamp.

5. The method of claim 1, wherein the one or more secure locations include ZIP codes.

6. The method of claim 1, wherein the one or more secure locations include regions proximate to routine locations that the user of the portable electronic device visited at least N times during the time interval.

7. The method of claim 1, wherein the locations are tracked using at least one of: a global positioning system, a cellular telephone system and a local positioning system.

8. The method of claim 1, wherein the locations are tracked according to a hierarchy, in which:

if available, a global positioning system is used to track the locations;

if the global positioning system is unavailable, a cellular telephone system is used to track the locations; and if the cellular telephone system is unavailable, previously tracked locations during at least a portion of the time interval are used to estimate the locations.

9. The method of claim 1, wherein the locations are tracked according to a hierarchy, in which:

if available, a global positioning system is used to track the locations;

if the global positioning system is unavailable, a cellular telephone system is used to track the locations; and if the cellular telephone system is unavailable, the locations are estimated based on a last known location of the portable electronic device and measurements performed using an accelerometer in the portable electronic device.

10. A computer-program product for use in conjunction with a computer system, the computer-program product comprising a non-transitory computer-readable storage medium and a computer-program mechanism embedded therein, the computer-program mechanism including:

instructions for tracking locations of a portable electronic device during a time interval;

instructions for determining a location pattern based on the tracked locations;

instructions for estimating one or more secure locations based on the determined location pattern;

instructions for receiving a current location of the portable electronic device; and when a user accesses financial information using the portable electronic device, instructions for determining a security level by:

when the current location comprises a location in the one or more secure locations, presenting a security challenge to the user and causing access to be granted to the financial information when the user correctly answers the security challenge, and otherwise, when the current location is different from the one or more secure locations, presenting the security challenge and one or more additional security challenges to the user and causing access to be granted to the financial information when the user correctly answers the security challenge and the one or more additional security challenges.

11. The computer-program product of claim 10, wherein the one or more secure locations include routine locations that the user of the portable electronic device visited at least N times during the time interval.

12. The computer-program product of claim 10, wherein, if the current location is within or proximate to one of the secure locations, the determined security level makes it easier for the user to access the financial information than the security level when the current location is outside of the secure locations.

13. The computer-program product of claim 10, wherein the computer-program mechanism further includes:

instructions for tracking timestamps during the time interval when the portable electronic device is at the locations, wherein the determined location pattern is further based on the timestamps; and instructions for receiving a timestamp when the portable electronic device is at the current location, wherein the determined security level is further based on the timestamp.

14. The computer-program product of claim 10, wherein the one or more secure locations include ZIP codes.

15. The computer-program product of claim 10, wherein the one or more secure locations include regions proximate to routine locations that the user of the portable electronic device visited at least N times during the time interval.

16. The computer-program product of claim 10, wherein the locations are tracked using at least one of: a global positioning system, a cellular telephone system and a local positioning system.

17. The computer-program product of claim 10, wherein the locations are tracked according to a hierarchy, in which:

if available, a global positioning system is used to track the locations;

if the global positioning system is unavailable, a cellular telephone system is used to track the locations; and if the cellular telephone system is unavailable, previously tracked locations during at least a portion of the time interval are used to estimate the locations.

18. The computer-program product of claim 10, wherein the locations are tracked according to a hierarchy, in which:

if available, a global positioning system is used to track the locations;

if the global positioning system is unavailable, a cellular telephone system is used to track the locations; and if the cellular telephone system is unavailable, the locations are estimated based on a last known location of the portable electronic device and measurements performed using an accelerometer in the portable electronic device.

19. A computer system, comprising:
a processor;
memory; and
a program module, wherein the program module is stored in the memory and configurable to be executed by the processor, the program module including:
  instructions for tracking locations of a portable electronic device during a time interval;
  instructions for determining a location pattern based on the tracked locations;
  instructions for estimating one or more secure locations based on the determined location pattern;
  instructions for receiving a current location of the portable electronic device; and
  when a user accesses financial information using the portable electronic device, instructions for determining a security level by:
    when the current location comprises a location in the one or more secure locations, presenting a security challenge to the user and causing access to be granted to the financial information when the user correctly answers the security challenge, and
    otherwise, when the current location is different from the one or more secure locations, presenting the security challenge and one or more additional security challenges to the user and causing access to be granted to the financial information when the user correctly answers the security challenge and the one or more additional security challenges.

20. The computer system of claim 19, wherein, if the current location is within or proximate to one of the secure locations, the determined security level makes it easier for the user to access the financial information than the security level when the current location is outside of the secure locations.

* * * * *